C. L. WOODY.
ATTACHMENT FOR TRACES.
APPLICATION FILED MAR. 24, 1916.
1,190,064.
Patented July 4, 1916.
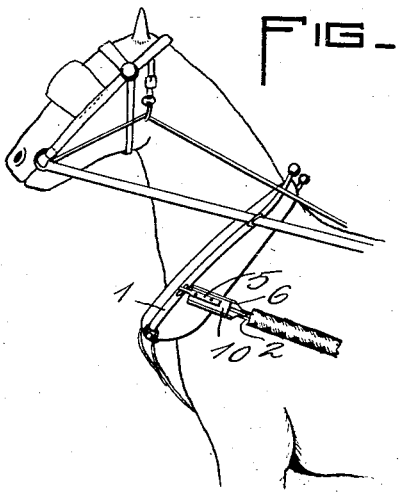
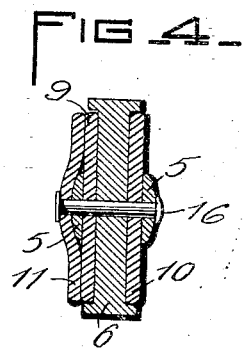
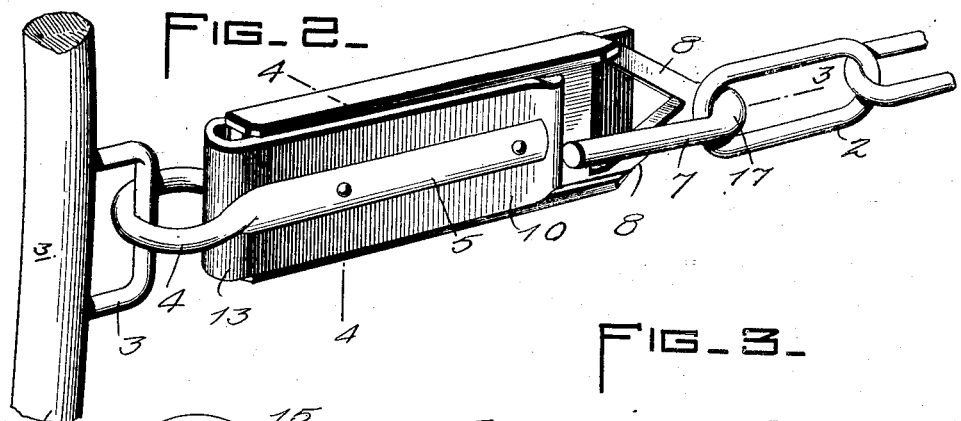
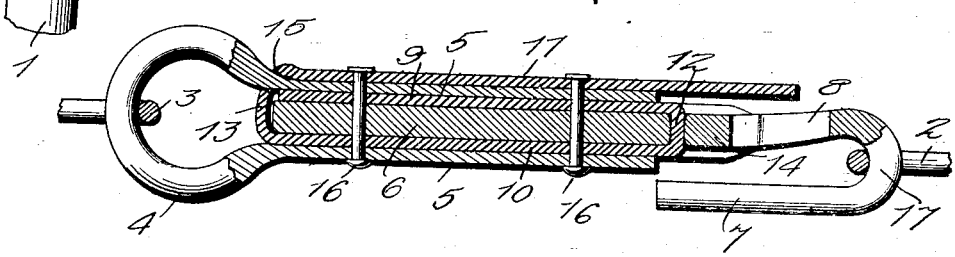
WITNESSES:
INVENTOR
CORTEZ L. WOODY,
BY
ATTORNEYS

UNITED STATES PATENT OFFICE.

CORTEZ LEANDER WOODY, OF JUDYVILLE, INDIANA.

ATTACHMENT FOR TRACES.

1,190,064.  Specification of Letters Patent.  Patented July 4, 1916.

Application filed March 24, 1916. Serial No. 86,390.

*To all whom it may concern:*

Be it known that I, CORTEZ LEANDER WOODY, a citizen of the United States, and a resident of Judyville, in the county of Warren and State of Indiana, have invented a new and useful Improvement in Attachments for Traces, of which the following is a specification.

My invention is an improvement in attachments for traces, and the invention has for its object to provide mechanism for connecting a trace to a hame in such manner that while the trace will be firmly attached to the hame the draft animal will be perfectly protected against rubbing or chafing from the metal, and the metal will be held out of contact with the animal, by means of the usual leather piping which covers the trace, and a shield forming a part of the attachment.

In the drawings: Figure 1 is a side view showing the attachment in use, Fig. 2 is an enlarged perspective view of the attachment in use, and Figs. 3 and 4 are sections on the lines 3—3 and 4—4, respectively, of Fig. 2.

The present embodiment of the invention is shown in connection with a hame 1, and a trace chain 2, the attachment being used for connecting the chain to the hame. The hame is provided with the usual holding clip or loop 3, and the attachment comprises a yoke-shaped member for engaging the clip or loop of the hame, and a hook for engaging the trace together with a connecting member for connecting the hook to the yoke-shaped member.

The clip or yoke-shaped member comprises a body 4, shaped to form an eye, and arms 5 extending parallel with each other in spaced relation. The yoke-shaped member is formed from a rod of suitable cross section, and the arms are flattened on their adjacent faces as shown. The hook comprises a body portion 6, I-shaped in cross section, and the hook proper 7, the hook being connected to the body at one end by means of integral connections 8. These connections diverge from the hook to the opposite sides of the body as shown, and the bill of the hook lies approximately parallel with the body in spaced relation, and is of a length to extend beyond the integral connection to overlie the body.

The hook is connected to the yoke-shaped member by means of a connection composed of a strip of leather bent upon itself to form three parallel portions 9, 10, and 11, which lie alongside each other in spaced relation, the portions 9 and 10 and 10 and 11 being connected at one end by integral connections 12 and 13, respectively, the connection 12 being at the end of the portions 9 and 10 adjacent to the hook, while the connection 13 is at the ends of the portions 10 and 11, adjacent to the yoke-shaped member.

The body 6 of the hook has a transverse slot 14 at the end adjacent to the hook through which the portion 12 of the connection passes, and at the connection 13 the strap is provided with an opening 15, near its junction with the portion 11 and the adjacent arm 5 of the yoke-shaped member passes through this opening. Thus the body of the hook is inserted between the portions 9 and 10 of the connecting strap and the arms 5 of the yoke-shaped member lap upon the outer faces of the said portions 9 and 10. The portion 11 of the connecting strap laps upon the outer faces of the portion 9 and of one of the arms 5 of the yoke-shaped member as shown in Fig. 4, and the said portion 11 is bent to fit closely over the said arm as shown.

Rivets 16 are passed through the arms 5 and through the portions 9, 10 and 11 of the connection to bind the parts together and the connecting strap is of such width that it will fit between the flanges of the I-shaped body as shown in Fig. 4. The portion 11 of the strap extends beyond the connection 12 and beyond the ends of the arms 5, the said portion 11 forming a species of pad or shield between the metal and the body of the draft animal.

It will be noticed from an inspection of Figs. 2 and 3 that the hook is reinforced or enlarged as indicated at 17 at the point where the chain 2 engages the same, and the bill of the hook lies close enough to the rear end of the adjacent arm 5 of the clip or U-shaped member so that after the clip is riveted in place the chain cannot become disengaged. With the usual piping or tubular member for inclosing the trace chain extending close to the hook, the trace chain and the attachment are prevented from touching the body of the animal, since the flanges of the I-shaped body 6 of the hook are not of sufficient depth to extend beyond the outer face of the strap connection. With the improved attachment and the chain trace, the draft animal is as comfortable as would be the case were the trace of leather.

It will be understood that with the present attachment, clip hames as shown in Figs. 1 and 2 may be used with chain or cable traces, that is, the attachment permits chain or cable traces to be attached to clip hames. Heretofore to attach a chain or cable to a hame a hook hame was required and the hooks permit the chains to be easily detached when the chains are slack, and in addition the chain links cut into the collar, soon ruining the same. They also chafe the horse's shoulder. A round cable trace if attached to a clip hame makes a small round crease in the collar and not having sufficient supporting surface to resist the pressure it thereby comes in contact with the horse's shoulder. With the present devices attached to a cable trace, the trace cannot contact with the shoulder. The advantage of the invention to the wholesaler and jobber will be obvious, since they will not be compelled to keep in stock both clip and hook hame, the clip hame serving for both leather chain and cable trace.

I claim:—

1. An attachment for connecting a trace chain with a hame, comprising the combination with a hame engaging clip, of a hook member consisting of a rigid body, I-shaped in cross section, and provided at one end with a hook overlying the body and with a transverse slot at the end of the hook, and a strap of a width to fit between the flanges of the body for connecting the clip to the body, the arms of the clip embracing opposite sides of the body, and the strap lying upon opposite sides of the body of the hook between the arms and passing through the said slot, one end of the strap overlying the inner arm of the clip and the inner face of the body and extending beyond the end of the body at the hook.

2. An attachment for connecting a trace chain with a hame, comprising a hook for engaging the chain, a U-shaped clip for engaging the hame, the hook having a body lying between the arms of the clip, and a leather strip connecting the hook and the clip, and lying between the arms of the clip on the opposite sides of the body and having its end overlying the arm of the clip adjacent to the draft animal and extending beyond the body of the hook to underlie the same.

CORTEZ LEANDER WOODY.

Witnesses:
CHAS. A. TALBERT,
J. L. HUNT.

Copies of this patent may be obtained for five cents each, by addressing the "Commissioner of Patents Washington, D. C."